United States Patent
Okamoto et al.

(10) Patent No.: US 12,371,540 B2
(45) Date of Patent: Jul. 29, 2025

(54) WATER-SOLUBLE FILM AND PACKAGE (71) Applicant: KURARAY CO., LTD., Okayama (JP)

(72) Inventors: Minoru Okamoto, Okayama (JP); Sayaka Shimizu, Okayama (JP); Osamu Kazeto, Okayama (JP)

(73) Assignee: KURARAY CO., LTD., Okayama (JP)

( * ) Notice: Subject to any disclaimer, the term of this patent is extended or adjusted under 35 U.S.C. 154(b) by 668 days.

(21) Appl. No.: 17/360,076

(22) Filed: Jun. 28, 2021

(65) Prior Publication Data

US 2021/0324163 A1 Oct. 21, 2021

Related U.S. Application Data

(63) Continuation of application No. PCT/JP2019/051493, filed on Dec. 27, 2019.

(30) Foreign Application Priority Data

Dec. 28, 2018 (JP) ................. 2018-248292

(51) Int. Cl.
*C08J 5/18* (2006.01)
*B65D 65/46* (2006.01)
*C11D 17/04* (2006.01)

(52) U.S. Cl.
CPC ................ *C08J 5/18* (2013.01); *B65D 65/46* (2013.01); *C11D 17/042* (2013.01); *C08J 2329/04* (2013.01)

(58) Field of Classification Search
CPC ....... C08J 5/18; C08J 2329/04; C11D 17/042; B65D 65/46
See application file for complete search history.

(56) References Cited

U.S. PATENT DOCUMENTS

| | | | | |
|---|---|---|---|---|
| 4,478,971 A * | 10/1984 | Ballard | ................... | C08K 5/06 524/543 |
| 7,674,518 B2 | 3/2010 | Hayakawa et al. | | |
| 8,927,061 B2 | 1/2015 | Hikasa et al. | | |
| 9,908,957 B2 | 3/2018 | Mori et al. | | |
| 2003/0114332 A1* | 6/2003 | Ramcharan | ........ | C11D 17/0017 510/297 |
| 2007/0087171 A1 | 4/2007 | Hikasa et al. | | |
| 2009/0291282 A1* | 11/2009 | Kitamura | ............. | C08K 5/0016 428/220 |
| 2011/0236608 A1 | 9/2011 | Vavassori Bisutti | | |
| 2016/0002422 A1 | 1/2016 | Hochi et al. | | |
| 2016/0102279 A1 | 4/2016 | Labeque et al. | | |
| 2016/0194465 A1 | 7/2016 | Takafuji et al. | | |
| 2016/0340456 A1 | 11/2016 | Mori et al. | | |
| 2017/0233539 A1 | 8/2017 | Friedrich et al. | | |
| 2017/0259975 A1 | 9/2017 | Yonezawa et al. | | |
| 2017/0298155 A1 | 10/2017 | Takafuji et al. | | |
| 2017/0355938 A1 | 12/2017 | Lee et al. | | |
| 2018/0245028 A1 | 8/2018 | Ookubo et al. | | |
| 2018/0251613 A1 | 9/2018 | Hiura et al. | | |
| 2020/0063076 A1 | 2/2020 | Hiura | | |
| 2021/0171882 A1 | 6/2021 | Tanikawa et al. | | |

FOREIGN PATENT DOCUMENTS

| | | | |
|---|---|---|---|
| CA | 3001549 A1 | 10/2017 | |
| CN | 1871138 A | 11/2006 | |
| CN | 107746467 A | 3/2018 | |
| EP | 0347219 A1 | 12/1989 | |
| EP | 3348605 A1 | 7/2018 | |
| EP | 3348608 A1 | 7/2018 | |
| EP | 3677405 A1 | 7/2020 | |
| EP | 3904035 A1 | 11/2021 | |
| EP | 3904231 A1 | 11/2021 | |
| EP | 3904232 A1 | 11/2021 | |
| JP | H06-138321 A | 5/1994 | |
| JP | H10-296820 A | 11/1998 | |
| JP | 2000296529 A | 10/2000 | |
| JP | 2001329130 A * | 11/2001 | |
| JP | 2002-020507 A | 1/2002 | |
| JP | 2002-030162 A | 1/2002 | |
| JP | 2002020506 A * | 1/2002 | |
| JP | 2002-241797 A | 8/2002 | |
| JP | 2002-347112 A | 12/2002 | |
| JP | 2005-194295 A | 7/2005 | |
| JP | 2005179390 A | 7/2005 | |

(Continued)

OTHER PUBLICATIONS

Machine English translation of JP 2002-0301162, Isozaki et al., Jan. 2002.*
Machine English translation of JP 2015-057629, Shimoda et al., Mar. 26, 2015.*
Machine English translation of JP 2002-020506, Isozaki et al., Jan. 23, 2002.*
Machine English translation of JP 2001-329130, Isozaki et al., Nov. 27, 2001.*
Office Action issued in related Chinese Patent Application No. 201980086843.9 dated Jul. 25, 2022.

(Continued)

*Primary Examiner* — Patrick D Niland (74) *Attorney, Agent, or Firm* — Morgan, Lewis & Bockius LLP (57) ABSTRACT

Provided are a water-soluble film capable of maintaining good mechanical strength even when packaging a liquid detergent and the like while maintaining excellent water solubility of the water-soluble film and a package using the same. A water-soluble film of the present invention includes a polyvinyl alcohol resin. When a crystallinity index calculated for a first surface is Fd1 and a crystallinity index calculated for a second surface opposed to the first surface is Fd2 for FT-IR measurement of respective two surfaces of the water-soluble film by ATR technique using a diamond prism, the Fd1 and the Fd2 are $0.22 \leq Fd1 \leq 0.72$, $0.2 \leq Fd2 \leq 0.65$ and $Fd1/Fd2 \geq 1.1$.

20 Claims, 1 Drawing Sheet

(56) References Cited

FOREIGN PATENT DOCUMENTS

| | | | | |
|---|---|---|---|---|
| JP | 2010-155453 | A | 7/2010 | |
| JP | 2014-016649 | A | 1/2014 | |
| JP | 2015057629 | A * | 3/2015 | ............... C08J 5/18 |
| JP | WO2015/118978 | A1 | 8/2015 | |
| JP | 2016060746 | A | 4/2016 | |
| JP | WO2016/084836 | A1 | 6/2016 | |
| JP | 2016-150769 | A | 8/2016 | |
| JP | 2016-222834 | A | 12/2016 | |
| JP | WO2016/190235 | A1 | 12/2016 | |
| JP | WO2017/043505 | A1 | 3/2017 | |
| JP | 2017-078166 | A | 4/2017 | |
| JP | 2017-095679 | A | 6/2017 | |
| JP | 2017-110213 | A | 6/2017 | |
| JP | 2017-114931 | A | 6/2017 | |
| JP | 2017-115128 | A | 6/2017 | |
| JP | 2017-119434 | A | 7/2017 | |
| JP | 2017-119853 | A | 7/2017 | |
| JP | 2017-217866 | A | 12/2017 | |
| JP | WO2018/230583 | A1 | 12/2018 | |
| JP | 2019-044021 | A | 3/2019 | |
| JP | WO2019/198683 | A1 | 10/2019 | |
| WO | 2009/075202 | A1 | 6/2009 | |
| WO | 2013/146147 | A1 | 10/2013 | |
| WO | 2014/050696 | A1 | 4/2014 | |
| WO | 2017/043508 | A1 | 3/2017 | |
| WO | 2017043514 | A1 | 3/2017 | |
| WO | WO2017/043509 | A1 | 3/2017 | |
| WO | 2019/044751 | A1 | 3/2019 | |

OTHER PUBLICATIONS

Office Action issued in related Chinese Patent Application No. 201980086787.9 dated Aug. 2, 2022.
Office Action issued in Japanese Patent Application No. 2020-562511 (corresponding to U.S. Appl. No. 17/360,004) dated Jan. 16, 2023.
Office Action issued in Japanese Patent Application No. 2020-562512 (corresponding to U.S. Appl. No. 17/360,018) dated Jan. 16, 2023.
Office Action issued in Chinese Patent Application No. 201980086862.1 (corresponding to U.S. Appl. No. 17/359,952) dated Dec. 5, 2022.
Office Action issued in Chinese Patent Application No. 201980086856.6 (corresponding to U.S. Appl. No. 17/359,960) dated Dec. 27, 2022.
Office Action issued in Chinese Patent Application No. 201980086861.7 (corresponding to U.S. Appl. No. 17/360,040) dated Dec. 7, 2022.
Office Action issued in Chinese Patent Application No. 201980086834.X (corresponding to U.S. Appl. No. 17/360,098) dated Dec. 8, 2022.
Extended European Search Report issued in related European Patent Application No. 19901491.1 dated Aug. 18, 2022.
Extended European Search Report issued in related European Patent Application No. 19905634.2 dated Aug. 30, 2022.
Shiga et al., "Pulsed NMR Study of the Structure of Poly(vinyl alcohol)-Poly(sodium acrylate) Composite Hydrogel," Journal of Polymer Science: Part B: Polymer Physics, 32: 85-90 (1994).
Takigawa et al., "Structure and mechanical properties of poly(vinyl alcohol) gels swollen by various solvents," Polymer, 33 (11): 2334-2339 (1992).
Extended European Search Report issued in related European Patent Application No. 19903285.5 dated Aug. 24, 2022.
Extended European Search Report issued in related European Patent Application No. 19905828.0 dated Sep. 14, 2022.
Extended European Search Report issued in related European Patent Application No. 19905635.9 dated Sep. 14, 2022.
Extended European Search Report issued in related European Patent Application No. 19902016.5 dated Aug. 18, 2022.
Extended European Search Report issued in related European Patent Application No. 19901493.7 dated Aug. 24, 2022.
Jang et al., "Plasticizer effect on the melting and crystallization behavior of polyvinyl alcohol," Polymer, 44: 8139-8146 (2003).
Peppas, "Infrared spectroscopy of semicrystalline poly(vinyl alcohol) networks," Die Makromolekulare Chemie, 178 (2): 595-601 (1977) (English abstract only).
Extended European Search Report issued in related European Patent Application No. 19903286.3 dated Aug. 24, 2022.
Extended European Search Report issued in related European Patent Application No. 19905031.1 dated Sep. 1, 2022.
Office Action issued in U.S. Appl. No. 17/360,040 dated Jul. 7, 2023.
Second Office Action issued in Chinese Patent Application No. 201980086859.X dated Jul. 3, 2023, corresponding to U.S. Appl. No. 17/359,991.
Office Action issued in the U.S. Appl. No. 17/360,098, dated Sep. 27, 2023.
Office Action issued in the U.S. Appl. No. 17/360,004, dated Oct. 11, 2023.
Office Action issued in the U.S. Appl. No. 17/360,018, dated Oct. 11, 2023.
Office Action issued in the JP Patent Application No. 2020-562512, dated Nov. 28, 2023 (corresponding to U.S. Appl. No. 17/360,018).
Office Action issued in Japanese Patent Application No. 2020-562508 (corresponding to U.S. Appl. No. 17/359,952) dated Oct. 4, 2022.
Office Action issued in Japanese Patent Application No. 2020-562509 (corresponding to U.S. Appl. No. 17/359,960) dated Oct. 4, 2022.
Office Action issued in Japanese Patent Application No. 2020-562516 (corresponding to U.S. Appl. No. 17/360,098) dated Oct. 4, 2022.
Office Action issued in Japanese Patent Application No. 2020-562510 (corresponding to U.S. Appl. No. 17/359,991) dated Oct. 25, 2022.
Office Action issued in Japanese Patent Application No. 2020-562513 (corresponding to U.S. Appl. No. 17/360,040) dated Nov. 22, 2022.
Office Action issued in Japanese Patent Application No. 2020-562515 (corresponding to U.S. Appl. No. 17/360,076) dated Sep. 13, 2022.
Notice of Reasons for Refusal issued in Japanese Patent Application No. 2020-562510 corresponding to U.S. Appl. No. 17/359,991 dated Apr. 10, 2023.
Decision of Refusal issued in Japanese Patent Application No. 2020-562511 corresponding to U.S. Appl. No. 17/360,004 dated Mar. 29, 2023.
Office Action issued in Chinese Patent Application No. 201980086859.X corresponding to U.S. Appl. No. 17/359,991 dated Mar. 3, 2023.
Office Action issued in Chinese Patent Application No. 201980086844.3 corresponding to U.S. Appl. No. 17/360,055 dated Mar. 2, 2023.
Office Action issued in Chinese Patent Application No. 201980086857.0 corresponding to U.S. Appl. No. 17/360,076 dated Feb. 18, 2023.
Office Action issued in Chinese Patent Application No. 201980086834.X corresponding to U.S. Appl. No. 17/360,098 dated Feb. 23, 2023.
Office Action issued in Taiwanese Patent Application No. 108148017 corresponding to U.S. Appl. No. 17/360,098 dated Jan. 19, 2023.
International Search Report issued in related International Patent Application No. PCT/JP2019/051493 dated Mar. 24, 2020.
Office Action issued in Japanese Patent Application No. 2020-562512 corresponding to U.S. Appl. No. 17/360,018 dated Jun. 20, 2023.
Office Action issued in Chinese Patent Application No. 201980086856.6 corresponding to U.S. Appl. No. 17/359,960 dated Jun. 21, 2023.
Office Action issued in Chinese Patent Application No. 201980086787.9 corresponding to U.S. Appl. No. 17/360,004 dated Apr. 12, 2023.
Office Action issued in Chinese Patent Application No. 201980086844.3 corresponding to U.S. Appl. No. 17/360,055 dated Jun. 8, 2023.
Office Action issued in the U.S. Appl. No. 17/359,960, dated Feb. 20, 2024.
Office Action issued in the U.S. Appl. No. 17/359,991, dated Feb. 28, 2024.
Office Action issued in the U.S. Appl. No. 17/360,018, dated Mar. 26, 2024.
Office Action issued in the U.S. Appl. No. 17/360,004, dated Mar. 26, 2024.

(56) References Cited

OTHER PUBLICATIONS

Office Action issued in the U.S. Appl. No. 17/359,960, dated May 29, 2024.
Office Action issued in the U.S. Appl. No. 17/360,055, dated Apr. 11, 2024.
Written opposition on JP Application No. 2020-562508, U.S. Pat. No. 7,240,420, dispatched on Oct. 18, 2023—concise explanation in English attached (corresponding to U.S. Appl. No. 17/359,952).
Notice of reasons for revocation on JP Application No. 2020-562508, U.S. Pat. No. 7,240,420, dispatched on Nov. 15, 2023—concise explanation in English attached (corresponding to U.S. Appl. No. 17/359,952).
Trial and Appeal Decision No. 2020-35529, issued on JP Patent No. 2543748, May 30, 2003.
Office Action issued in the corresponding U.S. Appl. No. 17/360,055, mailed Aug. 27, 2024.
Office Action issued in the corresponding U.S. Appl. No. 17/359,952, mailed Sep. 27, 2024.

\* cited by examiner

WATER-SOLUBLE FILM AND PACKAGE

TECHNICAL FIELD

The present invention relates to a water-soluble film containing a water-soluble polyvinyl alcohol-based resin that is preferably used for packaging various chemicals and the like and a package using the same.

BACKGROUND ART

In the past, water-soluble films have been used in a wide range of applications, including packages to encapsulate various chemicals, such as detergents and pesticides, seeds, and the like, and there is an increasing demand for them due to the convenience.

For water-soluble films to be used for such an application, PVA films containing polyvinyl alcohol (hereinafter, may be simply referred to as "PVA") as a main component are widely used. A variety of techniques are proposed to improve various properties of such a water-soluble film. For example, water-soluble films are proposed that have increased water solubility by adding various additives, such as plasticizers, and by using modified PVA (e.g., refer to PTL 1).

CITATION LIST

Patent Literature

PTL 1: JP 2017-078166 A

SUMMARY OF INVENTION

Technical Problem

The water-soluble film disclosed in PTL 1 reduces the degree of crystallization to increase the water solubility by adjusting the amount of the plasticizer and the like to be added and by using modified PVA.

Meanwhile, in applications of PVA films for packaging liquid detergents and the like with increased demands in recent years, the liquid detergents and the like contain hydrophilic surfactants and the like and thus has a risk of causing swelling and reduction in mechanical strength of a PVA film, leading to deformation of a pouch and the like packaging the liquid detergents and the like during storage and transport, and in the worst case, tearing the pouch. To solve this problem, it is possible to increase the crystallinity of the PVA in the film and secure the mechanical strength by reducing the amount of the plasticizer and increasing the degree of saponification of the PVA, whereas such a method causes a problem of reduction in the water solubility. In addition, although coating of only the surface in contact with the liquid detergents and the like with a protective layer is considered as one of the solutions to inhibit the swelling of the PVA film, it causes a large increase in the film production costs.

It is an object of the present invention to provide a water-soluble film capable of maintaining good mechanical strength even when packaging a liquid detergent and the like while maintaining excellent water solubility of the water-soluble film, and a package using the same.

Solution to Problem

As a result of an intensive examination, the present inventors have found that the above problems were probably achieved by adjusting, in respective specific ranges, crystallinity indices on both surfaces of a water-soluble film containing a polyvinyl alcohol-based resin and appropriately selecting a crystallinity index of one surface in contact with liquid detergents and the like, and they made further investigation based on the findings to complete the present invention.

The present invention relates to [1] through [7] below.

[1] A water-soluble film including a polyvinyl alcohol resin, wherein,
when a crystallinity index calculated for a first surface is Fd1 and a crystallinity index calculated for a second surface opposed to the first surface is Fd2 for FT-IR measurement of respective two surfaces of the water-soluble film by ATR technique using a diamond prism,
the Fd1 and the Fd2 satisfy formulae below:

$$0.22 \leq Fd1 \leq 0.72, \ 0.2 \leq Fd2 \leq 0.65 \tag{1}$$

$$Fd1/Fd2 \geq 1.1 \tag{2}.$$

[2] The water-soluble film according to [1] above, wherein, when a crystallinity index calculated for the first surface is Fg1 and a crystallinity index calculated for the second surface is Fg2 for FT-IR measurement of the respective two surfaces by the ATR technique using a germanium prism,
the Fg1 and the Fg2 satisfy a formula below:

$$Fg1/Fg2 \geq 1.1 \tag{3}.$$

[3] The water-soluble film according to [1] or [2] above, wherein, when a crystallinity index calculated is Fg1 for FT-IR measurement of the first surface by the ATR technique using a germanium prism,
the Fd1 and the Fg1 satisfy a formula below:

$$Fg1/Fd1 \geq 1.05 \tag{4}.$$

[4] A package including: a packaging material composed of the water-soluble film according to any one of [1] through [3] above and a chemical encapsulated in the packaging material.

[5] The package according to [4] above, wherein the packaging material is configured to cause the first surface of the water-soluble film to contact the chemical.

[6] The package according to [4] or [5] above, wherein the chemical is a pesticide, a detergent, or a germicide.

[7] The package according to any one of [4] through [6] above, wherein the chemical is in a liquid form.

Advantageous Effects of Invention

According to the present invention, it is possible to provide a water-soluble film capable of maintaining good mechanical strength even when packaging a liquid detergent and the like while maintaining excellent water solubility of the water-soluble film and a package using the same.

DESCRIPTION OF EMBODIMENTS

The present invention is specifically described below.

FT-IR

The water-soluble film of the present invention contains a polyvinyl alcohol-based resin (PVA). In measurement of the infrared absorption spectrum of the water-soluble film, an absorption peak is usually observed at 1140 cm$^{-1}$. This peak is generally called as a crystallization band of the PVA and is one of the peaks derived from stretching vibration of the carbon bond (C—C). This peak is understood to be observed with emphasis when the phases of vibration coincide with each other due to crystallization of polymer molecular chains in the PVA film and the like. A higher degree of crystallization of the PVA film causes this peak at relatively high intensity.

In the present invention, it is possible to obtain the crystallinity index of the film by calculating a ratio intensity of the absorption peak intensity at 1140 cm$^{-1}$ to the absorption peak intensity observed at 1425 cm$^{-1}$ derived from deformation vibration of the methylene (—CH$_2$—), which is the PVA main chain, considered not to be dependent on the degree of crystallization.

Figure 1:
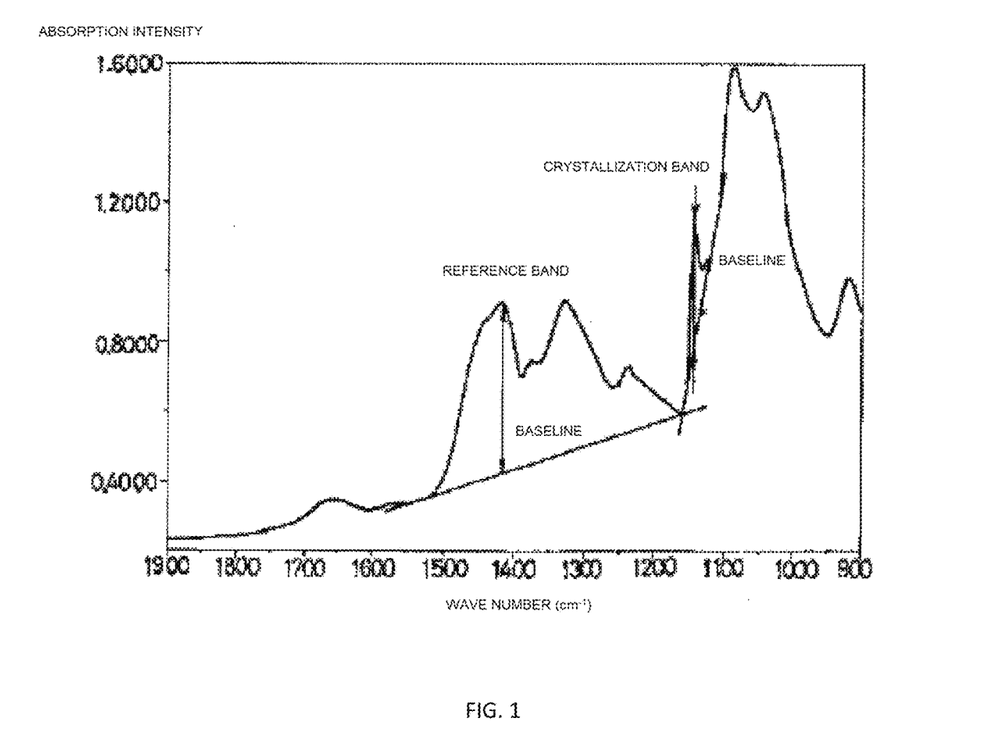
FIG. 1 illustrates an example of an infrared absorption spectrum of a film.

Specifically, baselines of the infrared absorption spectra at 1140 cm$^{-1}$ and 1425 cm$^{-1}$ are drawn as illustrated in FIG. 1 and heights from the baselines to respective peak tops at 1140 cm$^{-1}$ and 1425 cm$^{-1}$ are given as respective absorption peak intensity to define a value obtained by dividing the absorption peak intensity at 1140 cm$^{-1}$ by the absorption peak intensity at 1425 cm$^{-1}$ as a crystallinity index.

The crystallinity index value thus obtained is widely recognized to be proportional to the degree of crystallization of the PVA film (e.g., N. A. Peppas, Macromol. Chem., vol. 178, 595 (1977), JP 6-138321A). Since the crystallinity index value slightly varies depending on the moisture absorption amount of the film, in the present invention, the film is stored in an environment at a temperature of 24.0° C. and relative humidity of 45.0% RH for 24 hours and then FT-IR (Fourier transform infrared spectrometer) measurement is performed in this environment.

Figure 2:
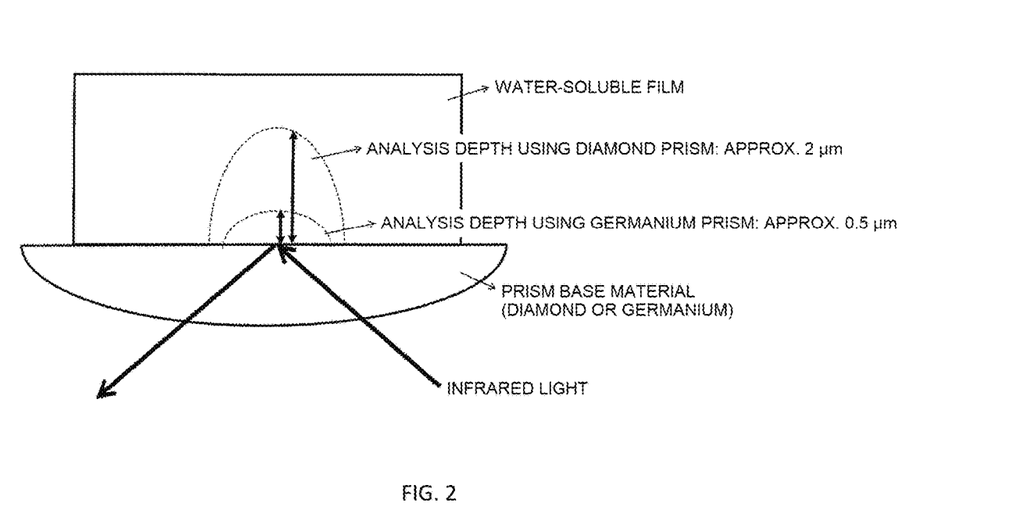
FIG. 2 schematically illustrates the ATR technique in infrared absorption spectrum measurement.

In the present invention, FT-IR measurement is performed by the ATR technique (attenuated total reflection technique). As illustrated in FIG. 2, the ATR technique is a kind of reflection IR analysis technique in which the film is closely contacted on an objective lens, called as an ATR prism, and the film is irradiated with infrared light at an angle from within the ATR prism to measure the spectrum of the reflected light. This technique has a characteristic of obtaining a sharp spectrum with less noise than by a general reflection IR analysis technique. In this measurement technique, the infrared light is reflected not only on the surface of the film but infrared light penetrating from the prism side slightly to the film side is also reflected to allow acquisition of information on the film surface and the surface layer. When the penetration depth of the infrared light is defined as d, the value is represented by a formula below.

$$d = \lambda/2\Pi n_1 \times 1/\{\sin^2\theta - (n_2/n_1)^2\}^{0.5} \quad (5)$$

In this formula, $n_1$ denotes a refractive index of the prism, $n_2$ denotes a refractive index of the film, $\lambda$ denotes a wavelength of the infrared rays, and $\theta$ denotes an angle of incidence of the infrared light. As clearly seen from this formula, it is possible to obtain an infrared absorption spectrum of reflection with a different penetration depth using a prism with a different refractive index.

In the present invention, as illustrated in FIG. 2, diamond with $n_1$ of 2.4 and germanium with $n_1$ of 4.0 are used as the prism. In the case of using these prisms, the penetration depths of the infrared light into the film surface layer at an angle of incidence of 45° and a wave number of 1140 cm$^{-1}$ are calculated to be, given the PVA has a refractive index of 1.5, approximately 2 μm in the case of the diamond prism and approximately 0.5 μm in the case of the germanium prism. That is, the crystallinity index using the diamond prism corresponds to the degree of crystallization of a relatively deep area within the film, whereas the crystallinity index using the germanium prism corresponds to the degree of crystallization of a very surface layer area close to the film surface.

The water-soluble film of the present invention (hereinafter, may be referred to as a "PVA film") contains a polyvinyl alcohol-based resin. It is important that crystallinity indices calculated by analyzing both surfaces of the PVA film by FT-IR satisfy specific formulae. That is, for FT-IR measurement of the respective two surfaces of the PVA film by the ATR technique using a diamond prism, when a crystallinity index calculated for one surface (may be referred to as a "first surface") is Fd1 and a crystallinity index calculated for the other surface (may be referred to as a "second surface") opposed to the one surface is Fd2, the Fd1 and the Fd2 satisfy formulae below:

$$0.22 \leq Fd1 \leq 0.72, \ 0.2 \leq Fd2 \leq 0.65 \quad (1)$$

$$Fd1/Fd2 \geq 1.1 \quad (2).$$

Fd1 of more than 0.72 or Fd2 of more than 0.65 causes insufficient water solubility of the PVA film. The Fd1 is preferably 0.65 or less, more preferably 0.58 or less, even more preferably 0.52 or less, and particularly preferably 0.47 or less. The Fd2 is preferably 0.6 or less, more preferably 0.55 or less, even more preferably 0.5 or less, and particularly preferably 0.45 or less.

Fd1 of less than 0.22 or Fd2 of less than 0.2 causes insufficient mechanical strength of the film. The Fd1 is preferably 0.27 or more, more preferably 0.31 or more, and even more preferably 0.36 or more. The Fd2 is preferably 0.25 or more, more preferably 0.30 or more, and even more preferably 0.35 or more.

In addition, in the present invention, Fd1 is more than Fd2. Specifically, it is important that a ratio of Fd1 and Fd2, that is, Fd1/Fd2 is 1.1 or more. Fd1/Fd2 of less than 1.1 causes difficulty in achievement of both excellent water solubility and good mechanical strength for packaging a liquid detergent and the like. Fd1/Fd2 is preferably 1.15 or more, more preferably 1.2 or more, even more preferably 1.25 or more, particularly preferably 1.3 or more, and most preferably 1.5 or more.

Meanwhile, the upper limit of Fd1/Fd does not have to be limited, but an excessively large ratio of Fd1/Fd, that is, an excessively large difference between the respective crystallinity indices of both surfaces of the PVA film has a risk of causing excessive curl during moisture absorption of the film and difficulty in handling of the film. The excessively large ratio is also likely to cause undissolved residues, such as the case where the PVA film has a dissolved surface and the other undissolved surface, and thus the ratio is preferably 1.60 or less, more preferably 1.50 or less, even more preferably 1.40 or less, particularly preferably 1.35 or less, and most preferably 1.30 or less.

In the present invention, for FT-IR measurement of the respective two surfaces of the PVA film by the ATR technique using a germanium prism, when a crystallinity index calculated for one surface is Fg1 and a crystallinity index calculated for the other surface is Fg2, Fg1 and Fg2 preferably satisfy a formula below from the perspective of achievement of both excellent water solubility and good mechanical strength for packaging a liquid detergent and the like:

$$Fg1/Fg2 \geq 1.1 \qquad (3).$$

Fg1/Fg2 of less than 1.1 sometimes causes difficulty in achievement of both excellent water solubility and good mechanical strength for packaging a liquid detergent and the like. Fg1/Fg2 is preferably 1.15 or more, more preferably 1.2 or more, even more preferably 1.25 or more, particularly preferably 1.3 or more, and most preferably 1.5 or more.

In the present invention. the lower limit of Fg1/Fd1 does not have to be limited, but preferably satisfies a formula (4) below from the perspective of good mechanical strength:

$$Fg1/Fd1 \geq 1.05 \qquad (4).$$

Fg1/Fd1 of more than 1.05, that is, a high crystallinity index of the very surface layer of the PVA film causes the surface of the PVA film in direct contact with the liquid detergent and the like to be less swollen and to maintain good mechanical strength.

Fg1/Fd1 is more preferably 1.1 or more, even more preferably 1.15 or more, particularly preferably 1.2 or more, and most preferably 1.25 or more. Meanwhile, the upper limit of Fg1/Fd1 does not have to be limited, but an excessively large rate is likely to cause undissolved residues, and thus the ratio is preferably 1.5 or less, more preferably 1.45 or less, even more preferably 1.4 or less, and particularly preferably 1.35 or less.

In the present invention, it is important to control the crystallinity indices of the one surface and the other surface of the water-soluble PVA film in the above range. Since the crystal structure of the PVA film is influenced by the film composition and various factors in the production procedure, examples of the method of controlling the crystallinity index include: a method that adjusts a kind (degree of saponification, amount of modification, mixing ratio of unmodified PVA/modified PVA, etc.) of the polyvinyl alcohol-based resin; a method that adjusts an amount of a plasticizer to be added; a method that adjusts film production conditions (surface temperature of roll support, heat treatment conditions, etc.); or a method of adjustment by combining these methods, and it is particularly important to provide different thermal histories to both surfaces of the film.

Polyvinyl Alcohol-Based Resin

The water-soluble film of the present invention contains a polyvinyl alcohol-based resin (PVA).

As the PVA, it is possible to use a polymer produced by saponifying a vinyl ester-based polymer obtained by polymerizing a vinyl ester-based monomer.

Examples of the vinyl ester-based monomer include vinyl formate, vinyl acetate, vinyl propionate, vinyl valerate, vinyl laurate, vinyl stearate, vinyl benzoate, vinyl pivalate, vinyl versatate, and the like. Among them, vinyl acetate is preferred as the vinyl ester-based monomer.

The vinyl ester-based polymer is preferably a polymer obtained using only one or more kinds of vinyl ester-based monomer as the monomer and more preferably a polymer obtained using only one kind of vinyl ester-based monomer as the monomer. It should be noted that the vinyl ester-based polymer may be a copolymer of one or more kinds of vinyl ester-based monomer and another monomer copolymerizable therewith.

Examples of such another monomer include: ethylene; olefins having a carbon number from 3 to 30, such as propylene, 1-butene, and isobutene; acrylic acid and salts thereof; acrylic esters, such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid and salts thereof; methacrylic esters, such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide derivatives, such as acrylamide, N-methylacrylamide, N-ethylacrylamide, N,N-dimethylacrylamide, diacetone acrylamide, acrylamidopropanesulfonic acid and salts thereof, acrylamide propyldimethylamine and salts thereof, and N-methylolacrylamide and derivatives thereof; methacrylamide derivatives, such as methacrylamide, N-methylmethacrylamide, N-ethylmethacrylamide, methacrylamidopropanesulfonic acid and salts thereof, methacrylamide propyldimethylamine and salts thereof, and N-methylolmethacrylamide and derivatives thereof; N-vinylamides, such as N-vinylformamide, N-vinylacetamide, and N-vinylpyrrolidone; vinyl ethers, such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; vinyl cyanides, such as acrylonitrile and methacrylonitrile; vinyl halides, such as vinyl chloride, vinylidene chloride, vinyl fluoride, and vinylidene fluoride; allyl compounds, such as allyl acetate and allyl chloride; maleic acid and salts, esters, and acid anhydrides thereof; itaconic acid and salts, esters, and acid anhydrides thereof; vinylsilyl compounds, such as vinyltrimethoxysilane; isopropenyl acetate; and the like.

It should be noted that the vinyl ester-based polymer may have a structural unit derived from one or more kinds of such another monomer to the vinyl ester-based polymer.

A higher ratio of the structural unit derived from such another monomer generally tends to cause difficulty in proceedings of crystallization of PVA. It is thus possible to adjust the crystallinity index of the PVA film by moderately copolymerizing such another monomer.

A ratio of the structural unit derived from such another monomer to the vinyl ester-based polymer does not have to be limited, but the ratio is preferably 15 mol % or less based on the number of moles of the total structural units constituting the vinyl ester-based polymer and more preferably 5 mol % or less.

A higher degree of polymerization generally tends to cause difficulty in proceedings of crystallization of PVA. Thus, in the present invention, the degree of polymerization of the PVA is preferably, but not particularly limited to, in a range below. That is, the lower limit of the degree of polymerization is preferably 200 or more from the perspective of inhibiting excessive crystallization and securing sufficient mechanical strength of the PVA film, more preferably 300 or more, and even more preferably 500 or more. Meanwhile, the upper limit of the degree of polymerization is preferably 8,000 or less from the perspective of achieving moderate proceedings of crystallization and increasing productivity of the PVA, productivity of the PVA film, and the like, more preferably 5,000 or less, and even more preferably 3,000 or less.

In this context, the degree of polymerization means an average degree of polymerization measured in accordance with the description of JIS K 6726-1994. The degree of polymerization herein is obtained by a following formula (6)

from the limiting viscosity [η] (unit: deciliter/g) measured, after resaponifying and purifying the PVA, in water at 30° C.

$$\text{Degree of Polymerization } Po=([\eta]\times 10^4/8.29)^{(1/0.62)} \qquad (6)$$

A higher degree of saponification generally tends to facilitate proceedings of crystallization of PVA. Thus, in the present invention, the degree of saponification of the PVA is preferably, but does not have to be limited to, from 64 to 95 mol %. Adjustment of the degree of saponification of the PVA in such a range achieves moderate proceedings of the crystallization of the PVA film and facilitates achievement of both the good water solubility and the inhibition of sticking between the films. The lower limit of the degree of saponification is more preferably 70 mol % or more and even more preferably 75 mol % or more. Meanwhile, the upper limit of the degree of saponification is more preferably 94 mol % or less and even more preferably 93 mol % or less.

In this context, the degree of saponification of the PVA means a ratio (mol %) indicating the number of moles of the vinyl alcohol units based on the total number of moles of the structural units (typically, vinyl ester-based monomer units) that may be converted to vinyl alcohol units by saponification and the vinyl alcohol units.

The degree of saponification of the PVA may be measured in accordance with the description of JIS K 6726-1994.

The PVA film may contain one kind of PVA singly or may contain two or more kinds of PVA having a degree of polymerization, a degree of saponification, a degree of modification, and the like different from each other.

The upper limit of the PVA content in the PVA film is preferably 100 mass % or less. Meanwhile, the lower limit of the PVA content is preferably 50 mass % or more, more preferably 80 mass % or more, and even more preferably 85 mass % or more.

Plasticizer

Since PVA films containing no plasticizer are generally hard films, they are likely to cause problems of rupture and the like in film formation and fabrication. Since such a film is also poor in texture and the like, the PVA film preferably contains a plasticizer. The plasticizer thus contained allows impartation of flexibility equivalent to other plastic films to the PVA film.

Examples of the plasticizer include polyhydric alcohols, such as ethylene glycol, glycerin, diglycerin, propylene glycol, diethylene glycol, triethylene glycol, tetraethylene glycol, trimethylolpropane, and sorbitol, and the like. One kind of these plasticizers may be singly used or two or more kinds of them may be used together. Among them, for the reasons of not readily bleeding out on a surface of the PVA film, the plasticizer is preferably ethylene glycol or glycerin and more preferably glycerin.

Addition of a moderate amount of the plasticizer to PVA generally accelerates crystallization. This is assumed to be because the molecules of the PVA are facilitated to move due to the addition of the plasticizer and thus facilitated to form a crystal or constrained amorphous structure, which is energetically more stable. In contrast, a PVA film containing an excessive amount of the plasticizer exhibits a tendency to inhibit proceedings of crystallization. This tendency is assumed to be because the amount of the plasticizer interacting with the hydroxyl groups in the molecules of PVA is large to cause reduction in the interaction between the molecules of PVA.

The lower limit of the content of the plasticizer in the PVA film is preferably 1 part by mass or more based on 100 parts by mass of the PVA, more preferably 3 parts by mass or more, and even more preferably 5 parts by mass or more.

Meanwhile, the upper limit of the content of the plasticizer is preferably 70 parts by mass or less based on 100 parts by mass of the PVA, more preferably 50 parts by mass or less, and even more preferably 40 parts by mass or less. The content of the plasticizer in the above range facilitates control of the crystallinity index of the PVA film, and in addition, sufficiently enables an effect of improving the mechanical strength, such as impact strength. It is also possible to preferably prevent or suppress the problems of reducing the handleability, bleeding out on the surface, and the like due to excessive flexibility of the PVA film.

Starch/Water-Soluble Polymer

The PVA film may contain starch and/or a water-soluble polymer other than PVA. The starch and/or the water-soluble polymer other than PVA thus contained allows impartation of mechanical strength to the PVA film, improvement of moisture resistance of the PVA film during handling, regulation of the rate of flexibilizing the PVA film, and the like due to water absorption during dissolution.

Examples of the starch include: natural starches, such as corn starch, potato starch, sweet potato starch, wheat starch, rice starch, tapioca starch, and sago starch; processed starches subjected to etherification, esterification, oxidation, and the like; and the like, and processed starches are particularly preferred.

The content of the starch in the PVA film is preferably 15 parts by mass or less based on 100 parts by mass of the PVA and more preferably 10 parts by mass or less. By keeping the content of the starch in the above range, it is possible to prevent or inhibit worsening of the processability of the PVA film.

Examples of the water-soluble polymer other than PVA include dextrin, gelatin, glue, casein, shellac, gum arabic, polyacrylic acid amide, sodium polyacrylate, polyvinyl methyl ether, copolymers of methyl vinyl ether and maleic anhydride, copolymers of vinyl acetate and itaconic acid, polyvinylpyrrolidone, cellulose, acetylcellulose, acetylbutylcellulose, carboxymethylcellulose, methylcellulose, ethylcellulose, hydroxyethylcellulose, sodium alginate, and the like.

The content of the water-soluble polymer other than PVA in the PVA film is preferably 15 parts by mass or less based on 100 parts by mass of the PVA and more preferably 10 parts by mass or less. The content of the water-soluble polymer other than PVA in the above range allows a sufficient increase in the water solubility of the PVA film.

Surfactant

The PVA film preferably contains a surfactant. The surfactant thus contained allows improvement of the handleability of the PVA film and the releasability of the PVA film from the film formation apparatus during production.

The surfactant is not particularly limited and, for example, anionic surfactants, nonionic surfactants, and the like may be used.

Examples of such an anionic surfactant include: carboxylic acid-based surfactants, such as potassium laurate; sulfuric ester-based surfactants, such as octyl sulfate; sulfonic acid-based surfactants, such as dodecylbenzenesulfonate; and the like.

Examples of such a nonionic surfactant include: alkyl ether-based surfactants, such as polyoxyethylene lauryl ether and polyoxyethylene oleyl ether; alkylphenyl ether-based surfactants, such as polyoxyethylene octylphenyl ether; alkyl ester-based surfactants, such as polyoxyethylene laurate; alkylamine-based surfactants, such as polyoxyethylene laurylamino ether; alkylamide-based surfactants, such as polyoxyethylene lauric acid amide; polypropylene glycol ether-based surfactants, such as polyoxyethylene polyoxypropylene ether; alkanolamide-based surfactants, such as lauric acid diethanolamide and oleic acid diethanolamide; allyl phenyl ether-based surfactants, such as polyoxyalkylene allyl phenyl ether; and the like.

One kind of these surfactants may be singly used or two or more kinds of them may be used together. Due to an excellent effect of reducing surface irregularities during formation of such a PVA film and the like, the surfactant is preferably nonionic surfactants, more preferably alkanolamide-based surfactants, and even more preferably dialkanolamide (e.g., diethanolamide, etc.) of aliphatic carboxylic acid (e.g., saturated or unsaturated aliphatic carboxylic acid having a carbon number from 8 to 30, etc.).

The lower limit of the content of the surfactant in the PVA film is preferably 0.01 part by mass or more based on 100 parts by mass of the PVA, more preferably 0.02 parts by mass or more, and even more preferably 0.05 parts by mass or more. Meanwhile, the upper limit of the content of the surfactant is preferably 10 parts by mass or less based on 100 parts by mass of the PVA, more preferably 1 part by mass or less, even more preferably 0.5 parts by mass or less, and particularly preferably 0.3 parts by mass or less. The content of the surfactant in the above range allows better releasability of the PVA film from the film formation apparatus during production and causes less problems of sticking (hereinafter, may be referred to as "blocking") between the PVA films and the like. The problems of bleeding out of the surfactant on a surface of the PVA film, deterioration of the appearance of the PVA film due to aggregation of the surfactant, and the like are also less likely to occur.

Other Components

In addition to the plasticizer, the starch, the water-soluble polymer other than PVA, and the surfactant, without impairing the effects of the present invention, the PVA film may contain components, such as moisture, antioxidants, ultraviolet absorbers, lubricants, cross-linking agents, colorants, fillers, antiseptics, mildewcides, and other polymer compounds.

The ratio of the summed mass of the PVA, the plasticizer, the starch, the water-soluble polymer other than PVA, and the surfactant to the total mass of the PVA film is preferably from 60 to 100 mass %, more preferably from 80 to 100 mass %, and even more preferably from 90 to 100 mass %.

Water-Soluble Film

Complete dissolution time of the PVA film immersed in deionized water at 10° C. is preferably, but not particularly limited to, in a range below. That is, the upper limit of the complete dissolution time is preferably 150 seconds or less, more preferably 90 seconds or less, even more preferably 60 seconds or less, and particularly preferably 45 seconds or less. The PVA film having the upper limit of the complete dissolution time in the above range completes the dissolution relatively early and thus is preferably used as a film for packaging (packaging material for) chemicals and the like. Meanwhile, the lower limit of the complete dissolution time is preferably 5 seconds or more, more preferably 10 seconds or more, even more preferably 15 seconds or more, and particularly preferably 20 seconds or more. The PVA film having the lower limit of the complete dissolution time in the above range causes less problems, such as blocking of the PVA films with each other and reduction in the mechanical strength due to absorption of moisture in the atmosphere.

The complete dissolution time when the PVA film is immersed in deionized water at 10° C. is measured as follows.

<1> The PVA film is left in a thermohygrostat conditioned at 20° C.—65% RH for 16 hours or more for humidity control.

<2> A rectangular sample with a length of 40 mm×a width of 35 mm is cut from the humidity controlled PVA film and then sandwiched for fixation between two 50 mm×50 mm plastic plates having a rectangular window (hole) with a length of 35 mm×a width 23 mm in a position where the longitudinal direction of the sample is parallel to the longitudinal direction of the window and the sample is approximately at the center in the window width direction.

<3> In a 500 mL beaker, 300 mL of deionized water is put and the water temperature is adjusted at 10° C. while stirring with a magnetic stirrer having a bar with a length of 3 cm at the number of revolutions of 280 rpm.

<4> The sample fixed to the plastic plates in <2> above is immersed in the deionized water in the beaker with attention not to contact the bar of the rotating magnetic stirrer.

<5> The time (second) from the immersion in the deionized water to complete disappearance of the sample pieces dispersed in the deionized water is measured.

The thickness of the PVA film is preferably, but not particularly limited to, in a range below. That is, the upper limit of the thickness is preferably 200 μm or less, more preferably 150 μm or less, even more preferably 100 μm or less, and particularly preferably 50 μm or less. Meanwhile, the lower limit of the thickness is preferably 5 μm or more, more preferably 10 μm or more, even more preferably 15 μm or more, and particularly preferably 20 μm or more. The thickness in the above range is not excessively large and thus preferably allows preventing worsening of fabricability of the PVA film while it is not excessively small and thus allows securing sufficient mechanical strength of the PVA film.

It should be noted that the thickness of the PVA film may be obtained as an average value of thicknesses measured at ten arbitrary spots (e.g., ten arbitrary spots on a straight line in the longitudinal direction of the PVA film).

Method of Producing Water-Soluble Film

A method of producing the water-soluble film (PVA film) of the present invention is not particularly limited and it is possible to use, for example, an arbitrary method as below.

Examples of such a method include: a film formation method where a solvent, additives, and the like are added to PVA and homogenized to obtain a film forming stock solution to be subjected to casting film formation, wet film formation (discharge into a poor solvent), dry/wet film formation, gel film formation (a method where the film forming stock solution is temporarily cooled to form a gel and then the solvent is extracted and removed), and combination thereof, melt extrusion film formation where the film forming stock solution thus obtained is extruded from a T die or the like using an extruder or the like, inflation molding, and the like. Among them, the method of producing the PVA film is preferably casting film formation or melt extrusion film formation. Use of these methods allows a homogeneous PVA film to be productively obtained.

A description is given below to a case of producing the PVA film using casting film formation or melt extrusion film formation.

In a case of producing the PVA film using casting film formation or melt extrusion film formation, a film forming stock solution is prepared at first that contains PVA, a solvent, additives, such as the plasticizer, as needed. It should be noted that, in the case of the film forming stock solution containing the additives, the ratio of the additives to PVA in the film forming stock solution is substantially equal to the above-described ratio of the additives to PVA in the PVA film.

The film forming stock solution is then casted (fed) in the form of film on a rotating support, such as a metal roll and a metal belt. A liquid coating of the film forming stock solution is thus formed on the support. The liquid coating is heated on the support to remove the solvent and thus solidified to be formed into a film. Examples of the method of heating the liquid coating include: a method that causes the support itself to be at high temperatures with a heating medium or the like; a method that blows hot air on the opposite surface to the surface in contact with the support of the liquid coating; and the like.

The solidified long film (PVA film) is released from the support, dried as needed by a drying roll, a drying furnace, and the like, and further heat treated as needed to be wound in a roll.

In the drying process of the liquid coating casted on the support (solvent removal process) and the following drying process of the PVA film, crystallization proceeds while the PVA is heated. The rate of crystallization in this process is influenced by the moisture content in the PVA, the temperature, and the drawing (tensile ductility in the flow direction) in addition to the ratio of the structural unit derived from such another monomer, the degree of polymerization, the degree of saponification, and the content of the plasticizer. The influence by the drawing is assumed to be because of the oriented crystallization by tension of the PVA molecular chain.

Drying of a PVA film usually proceeds by volatilizing a volatile component from an open film surface not in contact with a support, a drying roll, and the like. Accordingly, concentration distribution of a volatile component, such as moisture, occurs in the film thickness direction during the course of drying, and thus crystallinity index distribution occurs in the thickness direction depending on the temperature and the drawing conditions on each occasion. The crystallinity index may be adjusted by the temperature of the support, the contact time with the support, the temperature and the amount of hot air, the temperatures of the drying roll and the drying furnace, and the like.

Appropriate adjustment of the above respective factors thus allows production of the water-soluble PVA film of the present invention.

The ratio of volatile components (concentration of the volatile components, such as the solvent removed by volatilization and evaporation during film formation and the like) in the film forming stock solution is preferably from 50 to 90 mass % and more preferably from 55 to 80 mass %. The ratio of volatile components in the above range allows adjustment of the viscosity of the film forming stock solution in a preferred range, thereby improving film formability of the PVA film (liquid coating) and facilitating production of the PVA film with a uniform thickness. The ratio of volatile components in the film forming stock solution is appropriate and thus the crystallization of the PVA on the support moderately proceeds to facilitate adjusting the crystallinity index and its distribution.

In this context, the "ratio of volatile components in the film forming stock solution" herein means a value obtained by the following formula.

Ratio of Volatile Components in Film Forming Stock Solution (mass %)=$\{(Wa-Wb)/Wa\}\times 100$ (7)

In the formula, Wa denotes the mass (g) of the film forming stock solution and Wb denotes the mass (g) of the film forming stock solution after Wa (g) of the solution is dried in an electric heat drier at 105° C. for 16 hours.

Examples of the method of adjusting the film forming stock solution include, but not particularly limited to, a method where PVA and the additives, such as a plasticizer and a surfactant, are dissolved in a dissolution tank or the like, a method where PVA in a hydrated state is melt kneaded together with the additives, such as a plasticizer and a surfactant, using a single- or twin-screw extruder, and the like.

The film forming stock solution is generally casted in the form of film on the support, such as a metal roll and a metal belt, passing through die lips of a die, such as a T die. As described above, on the support, the solvent is volatilized from the surface not in contact with the support (hereinafter, may be referred to as a "free surface") of the casted stock solution in the form of film, and meanwhile, is not substantially volatilized from the surface in contact with the support (hereinafter, may be referred to as a "a touch surface"), and thus a solvent concentration distribution occurs in which the solvent concentration is low on the free surface side and high on the touch surface side in the film thickness direction. Accordingly, the solidification of the PVA also proceeds first from the free surface side.

The crystallization of the PVA also proceeds in parallel with the solidification of the PVA. The crystallization of the PVA does not readily proceed at both too high and too low solvent concentrations, and although it depends on the primary structure of the PVA molecules, readily proceeds when the volatile component in the casted PVA film is in a range from 20 to 60 mass %. Although a higher temperature causes an increase in the rate of crystallization, a higher temperature also causes an increase in the rate of volatilization of the solvent. For control of a difference between the crystallinity indices of the free surface and the touch surface of the PVA film, it is also important to control the temperature of the atmosphere near the free surface, the vapor pressure of the solvent, and the like in addition to the temperature of the support, the contact time with the support, and the like.

Since the PVA film of the present invention has a difference between the crystallinity indices of the free surface and the touch surface and may be obtained by employing, as an example, conditions for rapid drying, such as an increase in the drying temperature, in an initial stage of drying when the ratio of volatile components in the free surface is reduced to reduce the moisture content in the surface layer area before the crystallization proceeds and also by increasing the contact time with the support to cause the crystallization on the touch surface to proceed.

This allows the crystallinity index of the touch surface of the water-soluble film to be controlled high and the crystallinity index of the free surface to be controlled low.

Specifically, the surface temperature of the support for casting of the film forming stock solution is preferably from 70° C. to 130° C., more preferably from 80° C. to 120° C., and even more preferably from 85° C. to 115° C. The contact time with the support is preferably from 15 to 300 seconds, more preferably from 20 to 240 seconds, even more preferably from 25 to 180 seconds, and particularly preferably from 40 to 150 seconds.

The surface temperature of the support and the contact time with the support in the above range causes crystallization in the touch surface and the free surface to proceed at a moderate rate and thus facilitates production of the PVA film of the present invention.

Simultaneously with heating of the liquid coating on the support, hot air at a wind velocity from 1 to 10 m/second may be uniformly blown on the entire region on a free surface side of the liquid coating. The temperature of the hot air blown on the free surface side is preferably from 60° C. to 160° C. and more preferably from 70° C. to 140° C. The humidity of the hot air is preferably in a range from 20% to 90% RH, more preferably in a range from 30% to 80% RH, and even more preferably in a range from 40% to 80% RH. The temperature and humidity of the hot air blown on the non-contact surface side in the above ranges facilitates production of the PVA film of the present invention.

The PVA film is preferably dried (solvent removal) to a ratio of volatile components from 5 to 50 mass % on the support and then released from the support and further dried as needed.

Examples of the drying method include, but not particularly limited to, a method including passing through a drying furnace and a method including contacting a drying roll.

In the case of drying the PVA film using a plurality of drying rolls, it is preferred that one surface and the other surface of the PVA film alternately contact the drying rolls. This allows control of a difference between the crystallinity indices of the PVA on both surfaces of the PVA film. In this case, the number of drying rolls is preferably three or more, more preferably four or more, and even more preferably from 5 to 30.

The temperature of the drying furnace or the drying roll(s) is preferably from 30° C. to 100° C. The upper limit of the temperature of the drying furnace or the drying roll(s) is more preferably 110° C. or less, even more preferably 100° C. or less, and particularly preferably 95° C. or less. Meanwhile, the lower limit of the temperature of the drying furnace or the drying roll(s) is more preferably 45° C. or more and even more preferably 50° C. or more. The temperature of the drying furnace or the drying roll(s) in the range between the upper limit and the lower limit facilitates production of a PVA film having the effects of the present invention.

The PVA film after drying may further be heat treated as needed. The heat treatment allows adjustment of the properties, such as mechanical strength and water solubility, of the PVA film.

The temperature of the heat treatment is preferably from 60° C. to 125° C. The upper limit of the heat treatment temperature is more preferably 120° C. or less. The temperature of the heat treatment more than the above range has a risk of causing crystallization of PVA to excessively proceed and difficulty in production of the PVA film of the present invention.

In general, the amount of heat provided on the free surface side of the PVA film less than the amount of heat provided on the touch surface side tends to increase the difference between the crystallinity indices of both. Accordingly, appropriate adjustment of the heat treatment conditions on the respective surfaces is also one of the methods of obtaining the film of the present invention.

The PVA film thus produced is subjected to further humidity control, cutting of both edges (trimmings) of the film, and the like as needed, and then wound in a roll on a cylindrical core and moistureproof packaged to be a product.

The ratio of volatile components in the PVA film finally obtained through the series of treatment is preferably, but not particularly limited to, from 1 to 5 mass % and more preferably from 2 to 4 mass %.

Applications

The water-soluble PVA film of the present invention has excellent balance between the mechanical strength and the water solubility and is preferably used in various film applications to which general water-soluble films are applied, and among all, preferably applied to the packaging films for chemicals containing a hydrophilic substance, such as a liquid detergent.

In the case of applying the water-soluble film of the present invention to packaging films for chemicals containing a hydrophilic substance, examples of the kind of chemical include pesticides, detergents (including bleaches), germicides, and the like. The properties of the chemicals are not particularly limited and may be acidic, neutral, or alkaline. The chemicals may contain boron-containing compound(s) and/or halogen-containing compound(s).

The form of package is preferably, but not particularly limited to, unit packaging to package (preferably, seal package) the chemicals per unit amount.

A package of the present invention is obtained by packaging a chemical by applying the water-soluble film of the present invention to a packaging film for chemicals. In other words, the package of the present invention includes a packaging material (capsule) composed of the water-soluble film of the present invention and a chemical encapsulated in the packaging material.

EXAMPLES

Although the present invention is specifically described below by way of Examples and the like, the present invention is not at all limited by Examples below. It should be noted that evaluation items of each water-soluble PVA film and methods thereof were as follows.

Complete Dissolution Time of PVA Film

The complete dissolution time (second) of the PVA film immersed in deionized water at 10° C. was measured by the method described above.

Calculation of Crystallinity Index by FT-IR Measurement

As described above, since the crystallinity index value slightly varies depending on the moisture absorption amount of the film, in the present invention, the film was stored in an environment at a temperature of 24.0° C. and relative humidity of 45.0% RH for 24 hours and then measurement was performed by FT-IR set up in a room in this environment. Both surfaces of the film were subjected to the measurement under conditions below.

Measurement Apparatus: NICOLET is 10 (manufactured by Thermo Fisher)
Measurement Conditions: single reflection ATR technique, angle of incidence of 45°
Resolving Power: 4.0 cm$^{-1}$
Number of Accumulation: 32 times
Measurement Temperature: 24.0° C. (environmental temperature)
Measurement Humidity: 45.0% RH (environmental relative humidity)
Prism: Diamond or Germanium The IR spectra on both surfaces of the PVA film were measured by FT-IR to calculate the crystallinity indices by the above method.

Transport Test

Two samples were cut into 50×70 mm from the PVA film and overlaid to put the one surfaces of the film inside, that is, the surfaces with a high crystallinity index (surfaces subjected to Fd1 and Fg1 measurement) inside and water sealed on three sides to prepare a pouch. Approximately 35 g of a detergent was put in the pouch thus obtained and water sealed on an upper portion (opening) of the pouch for tight closure to prepare a package. It should be noted that the detergent had composition of 8 mass % of monoethanolamine, 24 mass % of dodecylbenzenesulfonic acid, 20 mass % of oleic acid, 24 mass % of lauryl alcohol ethoxylate, 9 mass % of propylene glycol, 9 mass % of diethylene glycol, and 6 mass % of water.

A hundred packages thus obtained were then packed in a 45 L polyethylene bag, and the bag was put in a corrugated cardboard carton (320×335×325 cm). A gap between the polyethylene bag and the corrugated cardboard carton was filled with cushioning. The corrugated cardboard carton containing the packages was then loaded onto a truck to perform a transport test of traveling between Okayama Prefecture and Tokyo Prefecture, Japan, 30 times.

The packages after transport were visually observed to check the total number of torn packages and clearly deformed packages.

Example 1

At first, a film forming stock solution was prepared by adding 100 parts by mass of PVA (degree of saponification of 88 mol %, viscosity-average degree of polymerization of 1700) obtained by saponifying polyvinyl acetate, 10 parts by mass of glycerin as the plasticizer, 0.1 part by mass of lauric acid diethanolamide as the surfactant, and water. It should be noted that the ratio of volatile components in the film forming stock solution was 68 mass %.

The film forming stock solution was then discharged in the form of film on a first drying roll (surface temperature of 98° C.) from a T die to form a liquid coating on the first drying roll. On the first drying roll, hot air at 95° C. was blown for drying at a rate of 5 m/second on the entire surface of the liquid coating not in contact with the first drying roll. A PVA film was thus obtained. The time of contact between the first drying roll and the PVA film was 42 seconds.

The dried PVA film (dried to a moisture content of 21 mass %) was then released from the first drying roll and dried by alternately contacting one surface and the other surface of the PVA film with respective drying rolls, and then heat treated by causing only the touch surface of the PVA film to contact a metal roll having a surface temperature of 120° C. for 30 seconds. The PVA film thus obtained was wound on a cylindrical core in a roll. It should be noted that the rolls of second and later drying rolls had a surface temperature set at approximately 65° C. The PVA film thus obtained had a thickness of 35 μm and a width of 1200 mm.

The PVA film obtained by the above method was subjected to measurement of the complete dissolution time at 10° C. The IR spectrum of the PVA film thus obtained was then measured by FT-IR to calculate the crystallinity indices. Moreover, using the film thus obtained, a transport test was performed. The results are shown in Table 1.

Example 2

A PVA film was obtained in the same manner as in Example 1 except for changing the PVA used for preparation of the film forming stock solution to maleic acid monomethyl ester (MMM) modified PVA (degree of saponification of 90 mol %, degree of polymerization of 1700, amount of MMM modification of 5 mol %). The PVA film thus obtained was subjected to evaluation of the complete dissolution time at 10° C. and the crystallinity index. Moreover, using the PVA film thus obtained, a transport test was performed. The results are shown in Table 1.

Example 3

A PVA film was obtained in the same manner as in Example 1 except for changing the surface temperature of the first drying roll to 80° C. and further the surface temperature of the rolls of second and later drying rolls to 75° C. The PVA film thus obtained was subjected to evaluation of the complete dissolution time at 10° C. and the crystallinity index. Moreover, using the film thus obtained, a transport test was performed. The results are shown in Table 1.

Example 4

A PVA film was obtained in the same manner as in Example 1 except for changing the PVA used for preparation of the film forming stock solution to acrylamide-2-methylpropanesulfonic acid sodium salt (AMPS) modified PVA (degree of saponification of 88 mol %, degree of polymerization of 1700, amount of AMPS modification of 2 mol %). The PVA film thus obtained was subjected to evaluation of the complete dissolution time at 10° C. and the crystallinity index. Moreover, using the film thus obtained, a transport test was performed. The results are shown in Table 1.

Comparative Example 1

A PVA film was obtained in the same manner as in Example 2 except for changing the surface temperature of the first drying roll to 80° C. and the surface temperature of the rolls of second and later drying rolls to 75° C., and not performing the heat treatment. The time of contact between the first drying roll and the PVA film was 77 seconds.

The PVA film thus obtained was subjected to evaluation of the complete dissolution time at 10° C. and the crystallinity index. Moreover, using the film thus obtained, a transport test was performed. The results are shown in Table 1.

Comparative Example 2

A PVA film was obtained in the same manner as in Example 2 except for performing the heat treatment after drying not only on the touch surface but also both on the touch surface and the free surface and changing the time of contact with the metal roll at 120° C. to 60 seconds, respectively. The PVA film thus obtained was subjected to evaluation of the complete dissolution time at 10° C. and the crystallinity index. The film thus obtained had poor solubility, and thus the transport test was not performed. The results are shown in Table 1.

Comparative Example 3

A PVA film was obtained in the same manner as in Example 1 except for changing the surface temperature of the first drying roll and the rolls of second and later drying rolls to 75° C. and further not performing the heat treatment after drying. The PVA film thus obtained was subjected to evaluation of the complete dissolution time at 10° C. and the crystallinity index. Moreover, using the film thus obtained, a transport test was performed. The results are shown in Table 1.

The evaluation results of the water-soluble films thus obtained are shown in Table 1.

TABLE 1

| | Modification | Fd1 | Fd2 | Fg1 | Fg2 | Fd1/Fd2 | Fg1/Fd1 | Fg1/Fg2 | Complete Dissolution Time sec | Number of Deformed/Torn Bags in |
|---|---|---|---|---|---|---|---|---|---|---|
| Example 1 | None | 0.48 | 0.43 | 0.53 | 0.48 | 1.12 | 1.10 | 1.10 | 31 | 2 |
| Example 2 | MMM | 0.46 | 0.37 | 0.50 | 0.41 | 1.24 | 1.09 | 1.22 | 34 | 1 |
| Example 3 | MMM | 0.43 | 0.33 | 0.28 | 0.22 | 1.30 | 0.65 | 1.27 | 29 | 6 |
| Example 4 | AMPS | 0.52 | 0.45 | 0.56 | 0.48 | 1.13 | 1.08 | 1.17 | 22 | 1 |
| Comparative Example 1 | MMM | 0.40 | 0.39 | 0.39 | 0.40 | 1.03 | 0.98 | 0.99 | 25 | 23 |
| Comparative Example 2 | MMM | 0.75 | 0.66 | 0.74 | 0.55 | 1.14 | 0.99 | 1.14 | 195 | — |
| Comparative Example 3 | MMM | 0.20 | 0.13 | 0.22 | 0.20 | 1.11 | 1.10 | 1.10 | 19 | 33 |

The invention claimed is:

1. A water-soluble film comprising a polyvinyl alcohol resin, wherein the water-soluble film is soluble in water,
wherein a complete dissolution time of the water-soluble film in deionized water at 10° C. is 150 seconds or less, and
when a crystallinity index calculated for a first surface is Fd1 and a crystallinity index calculated for a second surface opposed to the first surface is Fd2 for FT-IR measurement of respective two surfaces of the water-soluble film by ATR technique using a diamond prism, the Fd1 and the Fd2 satisfy formulae below:

$$0.22 \leq Fd1 \leq 0.72, \ 0.2 \leq Fd2 \leq 0.65 \quad (1)$$

$$Fd1/Fd2 \geq 1.1 \quad (2).$$

2. The water-soluble film according to claim 1, wherein, when a crystallinity index calculated for the first surface is Fg1 and a crystallinity index calculated for the second surface is Fg2 for FT-IR measurement of the respective two surfaces by the ATR technique using a germanium prism, the Fg1 and the Fg2 satisfy a formula below:

$$Fg1/Fg2 \geq 1.1 \quad (3).$$

3. The water-soluble film according to claim 1, wherein, when a crystallinity index calculated is Fg1 for FT-IR measurement of the first surface by the ATR technique using a germanium prism, the Fd1 and the Fg1 satisfy a formula below:

$$Fg1/Fd1 \geq 1.05 \quad (4).$$

4. A package comprising: a packaging material composed of the water-soluble film according to claim 1 and a chemical encapsulated in the packaging material.

5. The package according to claim 4, wherein the packaging material is configured to cause the first surface of the water-soluble film to contact the chemical.

6. The package according to claim 4, wherein the chemical is a pesticide, a detergent, or a germicide.

7. The package according to claim 4, wherein the chemical is in a liquid form.

8. The water-soluble film according to claim 1, wherein the polyvinyl alcohol resin has a degree of saponification of 64 to 93 mol %.

9. The water-soluble film according to claim 1, wherein the polyvinyl alcohol resin has a viscosity-average degree of polymerization of 500 to 8,000.

10. The water-soluble film according to claim 1, wherein the polyvinyl alcohol resin has a viscosity-average degree of polymerization of 200 to 300.

11. The water-soluble film according to claim 1, wherein the polyvinyl alcohol resin includes (i) a polymer obtained from one or more vinyl ester-based monomers, (ii) a copolymer of one or more vinyl ester-based monomers and a copolymerizable monomer, or (iii) both (i) and (ii).

12. The water-soluble film according to claim 11, wherein the polyvinyl alcohol resin includes the copolymer and the copolymerizable monomer includes maleic acid monomethyl ester.

13. The water-soluble film according to claim 11, wherein the polyvinyl alcohol resin includes the copolymer and the copolymerizable monomer includes acrylamide-2-methylpropanesulfonic acid sodium salt.

14. The water-soluble film according to claim 11, wherein the polyvinyl alcohol resin includes the copolymer, and a ratio of a number of structural unit derived from the copolymerizable monomer to a total number of structural units constituting the polyvinyl alcohol resin is 15 mol % or less.

15. The water-soluble film according to claim 11, wherein the polyvinyl alcohol resin includes the polymer obtained from the one or more vinyl ester-based monomers.

16. The water-soluble film according to claim 1, further comprising a plasticizer that includes glycerin.

17. The water-soluble film according to claim 16, comprising the plasticizer at an amount of 1 part by mass or more to 40 parts by mass or less, based on 100 parts by mass of the polyvinyl alcohol resin.

18. The water-soluble film according to claim 1, further comprising a surfactant at an amount of 10 parts by mass or less, based on 100 parts by mass of the polyvinyl alcohol resin, wherein the surfactant includes lauric acid diethanolamide.

19. A water-soluble film comprising a polyvinyl alcohol resin, wherein the water-soluble film is soluble in water,
wherein the polyvinyl alcohol resin has a viscosity-average degree of polymerization of 200 to 300, and
when a crystallinity index calculated for a first surface is Fd1 and a crystallinity index calculated for a second surface opposed to the first surface is Fd2 for FT-IR measurement of respective two surfaces of the water-soluble film by ATR technique using a diamond prism, the Fd1 and the Fd2 satisfy formulae below:

$$0.22 \leq Fd1 \leq 0.72, \; 0.2 \leq Fd2 \leq 0.65 \qquad (1)$$

$$Fd1/Fd2 \geq 1.1 \qquad (2).$$

20. A water-soluble film comprising a polyvinyl alcohol resin, wherein the water-soluble film is soluble in water,
wherein the polyvinyl alcohol resin includes a copolymer of one or more vinyl ester-based monomers and a copolymerizable monomer, wherein the copolymerizable monomer includes maleic acid monomethyl ester or acrylamide-2-methylpropanesulfonic acid sodium salt, and
when a crystallinity index calculated for a first surface is Fd1 and a crystallinity index calculated for a second surface opposed to the first surface is Fd2 for FT-IR measurement of respective two surfaces of the water-soluble film by ATR technique using a diamond prism, the Fd1 and the Fd2 satisfy formulae below:

$$0.22 \leq Fd1 \leq 0.72, \; 0.2 \leq Fd2 \leq 0.65 \qquad (1)$$

$$Fd1/Fd2 \geq 1.1 \qquad (2).$$

* * * * *